INVENTORS.
Ronald P. Lowry

United States Patent Office 3,263,981
Patented August 2, 1966

---

3,263,981
APPARATUS FOR TREATING EXPANDABLE THERMOPLASTIC RESINOUS PARTICULATE MATERIAL
Ronald P. Lowry, Midland, Mich., assignor to The Dow Chemical Company, Midland, Mich., a corporation of Delaware
Filed July 23, 1964, Ser. No. 384,642
5 Claims. (Cl. 263—21)

This invention relates to an apparatus for the treatment of expandable particulate thermoplastic resinous material. It more particularly relates to a prefoamer particularly adapted for the preparation of partialy foamed expandable plastic particles.

Expandable thermoplastic particles are utilized in a great number of applications including molding and as dunnage material for packaging. Such particles, for economic reasons, are generally shipped in the unexpanded form and then expanded at the location where they will be utilized. However, the equipment presently available for the expansion of such particles is generally large, complex, and expensive, or alternately crude equipment somewhat unsuited for the preparation of optimum foamed particles is employed.

It is an object of this invention to provide improved apparatus for the foaming of thermoplastic resinous particles.

It is an object of this invention to provide an apparatus which is capable of foaming intermittently small quantities of expandable plastic particles.

A further object of this invention is to provide the simple low cost, reliable foaming apparatus capable of batch foaming operation.

These benefits and other advantages in accordance with the present invention are readily achieved in an apparatus particularly adapted for the foaming of expandable plastic particles comprising in cooperative combination a vessel having a top portion and a bottom portion, and a cavity therein of generally constant cross sectional configuration, the bottom portion defining an opening generally commensurate in size with that of the cavity within the vessel, a closure in sealing engagement with the bottom of the vessel and so constructed and arranged so as to be readily removable therefrom, the closure comprising a housing, the housing and a foraminous sheet defining a chamber, means defining a passageway in communication with the chamber, the passageway having means to selectively place it in communication with an air source and a vent passageway, a steam source disposed in cooperative combination with the top portion of the vessel, means defining a vent disposed in the top portion of the vessel.

Further features and advantages of the present invention will be more apparent from the following specification when taken in connection with the drawing wherein.

Figure 1:
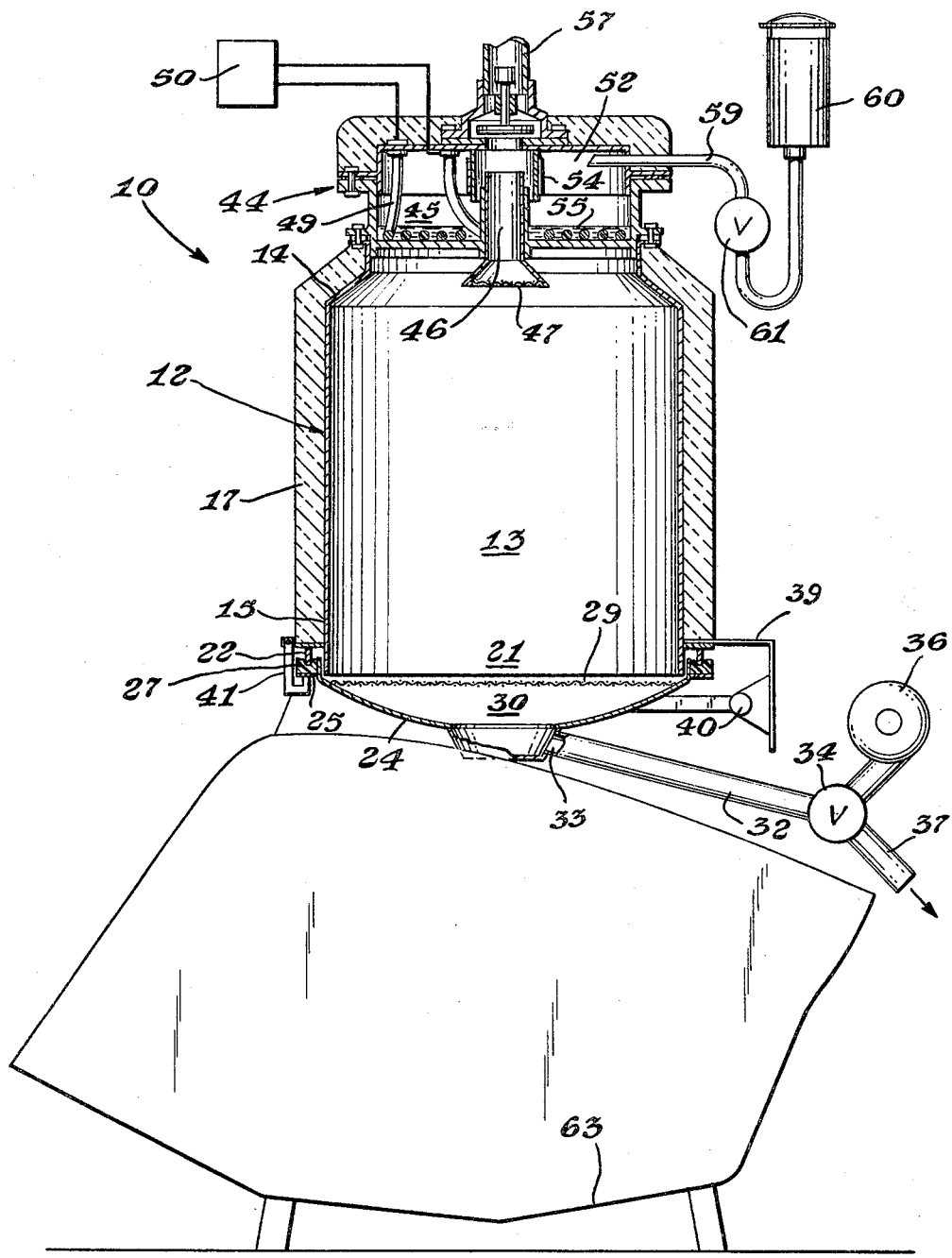
FIGURE 1 is a partly in section view of an apparatus in accordance with the invention.

In FIGURE 1 there is illustrated an apparatus in accordance with the present invention generally designated by the reference numeral 10. The apparatus 10 comprises in cooperative combination a vessel 12 defining a cavity 13, the vessel 12 has an upper end 14, a lower end 15, a wall 17 and insulation or lagging about the exterior thereof. A closure or cover 21 is in operative engagement with the lower end 15. The lower end 15 of the vessel defines an opening 21 which has a cross sectional configuration substantially commensurate with the cross sectional configuration of the cavity 13. A generally annular land 22 is disposed about the bottom end of 15 of the vessel 12 and disposed external to the cavity 13. A closure or bottom 24 is disposed in sealing engagement with the annular land 22. The bottom portion 24 has a generally annular flange 25 which supports a gasket 27 particularly adapted to mate with the annular flange 22 and seal the bottom portion of the vessel. A foraminous plate or screen 29 is secured to the bottom 24. The plate 29 in cooperative combination with the bottom 24 defines the chamber or plenum 30. A conduit 32 defines a passageway 33 which is in full communication with the plenum 30. Remote from the plenum 30 is a valving means 34. The valving means 34 selectively connects the conduit 33 to a blower 36 or a vent 37. The bottom 24 is pivotally attached to a bracket 39 at the hinge 40. The bottom 24 is maintained in sealing engagement with the annular flange 22 by means of the latch 41. A housing generally designated by the reference numeral 44 is disposed in sealing engagement with the upper end 14 of the vessel 12. The housing 44 defines a steam chamber 45 and a passage 46. The passage 46 has disposed therein a foraminous plate or screen 47. A helical heater 49 is disposed within the steam chamber 45 and is supplied with electric current from the power source 50. The housing 44 has an upper portion 52 which defines a baffle 54 extending generally concentrically about the passage 46 and adapted to prevent splashing of water 55 from the steam chamber 46 into the cavity 13. Generally adjacent the passageway 46 and the baffle 64 is a pressure relief valve 55 which provides communication between the steam chamber 45 and a conduit or vent 57. A water inlet 59 is in communication with a water feed tank 60 adapted to provide a desired quantity of water within the steam chamber 45. The flow of water from the water feed tank 60 is controlled by the valve 61. Immediately below the vessel 12 is disposed a hopper 63. In operation of the apparatus 10 of FIGURE 1 the bottom 24 is partially opened and a desired quantity of expandable particulate thermoplastic resinous material is placed upon the foraminous plate or screen 29. The vessel is then closed by engaging the flange 25 with the latch 41. A predetermined quantity of water is placed in the steam chamber 45 and power applied to the heated element 49. The valving means 34 is positioned in such a manner that the passageway 33 is in communication with the vent 37 as steam is generated in the steam generator 45 which passes through the passageway 46 on the screen 47, forcing the air from the cavity 13 and contacting the particulate thermoplastic resinous material resting upon the screen 29. The particulate material expands under the influence of the steam. Condensate is removed through the passage 33 and the vent 37. When expansion of the particulate plastic material is completed the position of the valving means 34 is altered to connect the exhaust portion of the blower 36 with the passageway 33 forcing relatively dry air through the foraminous plate 29 and the bed of expanded resinous material contained within the cavity 13 exhausing the air through the screen 47, the passageway 46 through the relief valve 55 and out of the vent 57, thus removing excess moisture from the foamed plastic material. The bottom 24 is then removed and the contents of the vessel discharged into the hopper 63.

Figure 2:
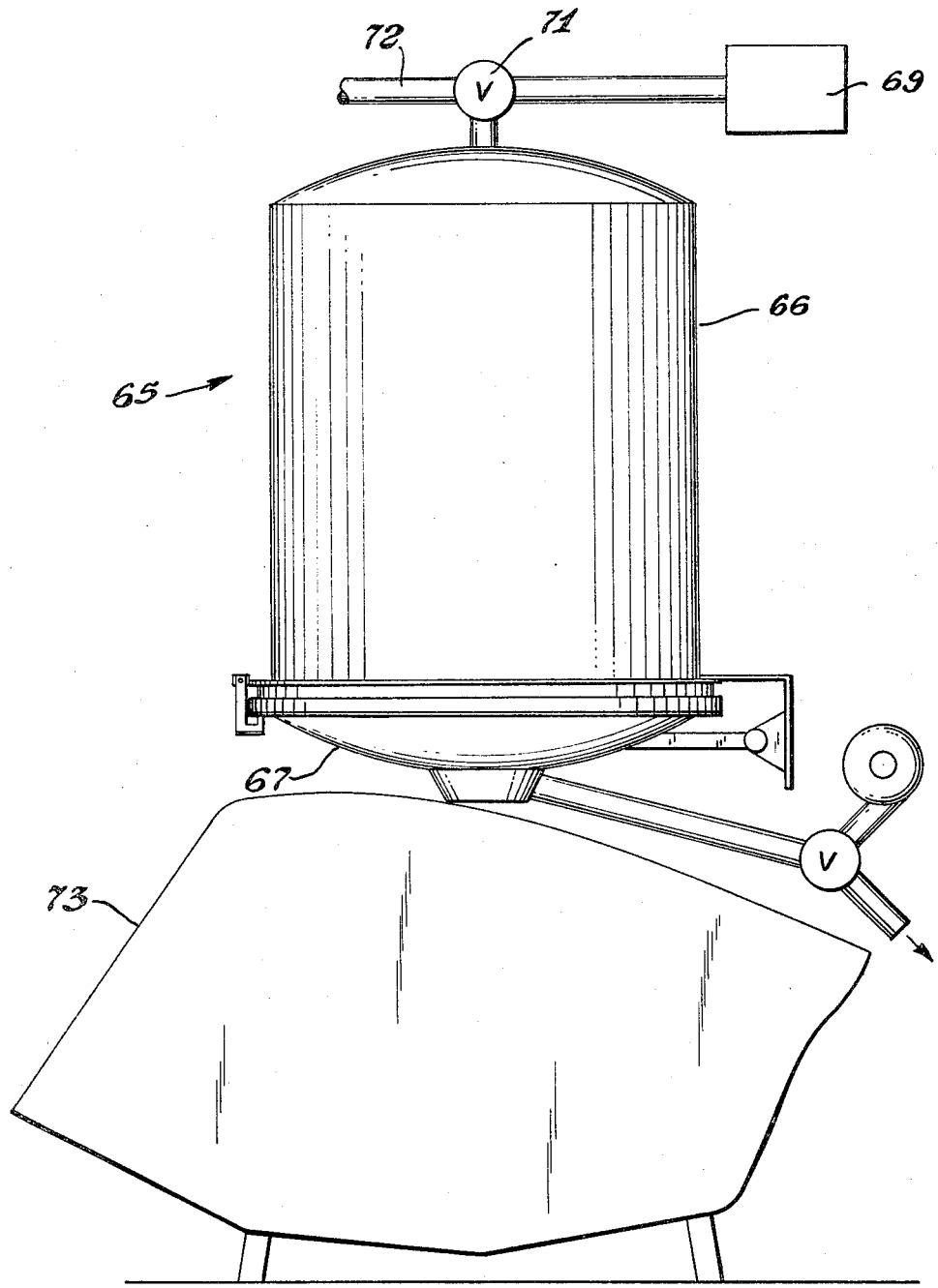
FIGURE 2 is a schematic representation of an alternate embodiment.

In FIGURE 2 there is depicted schematically an alternate embodiment of the invention generally designated by the reference numeral 65. The apparatus 65 comprises a vessel 66 having a removable bottom 67 functionally identical to the arrangement of FIGURE 1, a steam source 69 provides steam to a 3-way valve 71 which selectively provides communication between the steam source 69 and the vessel 66 or an atmospheric vent or exhaust 72 and a vessel 66, thus permitting operation in substantially the same manner as the embodiment of FIGURE 1. A hopper 73 is adapted to receive the foam plastic material from the vessel 66. The embodiments of FIGURES 1 and 2 are found to be particularly beneficial and advantageous for the foaming of polystyrene particles containing volatile blowing or expansion agents. Beneficially, a sufficient quantity of granules are placed on the screen or foraminous plate in the treating apparatus which, on expansion, is sufficient to fill the vessel to not more than about 90 percent of its volume, the predetermined quantity of water placed in the heating section, electric power applied until sufficient steam has been generated to expand the particles, subsequently room temperature air introduced to dry the expanded particles. Advantageously the embodiments of FIGURES 1 and 2 are beneficially employed to strandular expandable particles for dunnage material and successfully produce any desired volume of the expanded dunnage material up to about the internal volume of the vessel by the addition of a readily calculable amount of unexpanded material to the vessel.

As is apparent from the foregoing specification, the apparatus of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. An apparatus for the foaming of expandable plastic particles comprising in cooperative combination a vessel having a top portion and a bottom portion, the vessel having a cavity therein of generally constant cross sectional configuration, the bottom portion of the vessel defining an opening generally commensurate in size with that of the cavity within the vessel, a closure in sealing engagement with the bottom of the vessel and so constructed and arranged so as to be readily removable therefrom, the closure comprising a housing, the housing and a foraminous sheet defining a chamber, a passageway in communication with the chamber, the housing and foraminous sheet so constructed and arranged that the chamber is in communication with the cavity within the vessel by means of openings in the foraminous sheet, means defining a passageway in communication with the chamber, the passageway having means to selectively place it in communication with an air source and a vent passageway, a steam source disposed in cooperative combination with the top portion of the vessel, means defining a vent disposed in the top portion of the vessel and so constructed and arranged so as to permit the flow of gaseous material from the cavity within the vessel.

2. The apparatus of claim 1, wherein the steam source comprises a housing in sealing engagement with the top end of the vessel defining a steam chamber and a passage so constructed and arranged so as to provide communication between the steam chamber and the vessel, a heater disposed within the steam chamber so positioned and arranged so as to generate steam from water placed in the steam chamber and the means defining a vent comprising a valve adapted to be opened by means of pressure within the vessel.

3. The apparatus of claim 2 wherein the heater is an electric heater.

4. An apparatus for the expansion of thermoplastic resinous particles comprising in cooperative combination a vessel defining a cavity, the cavity having a substantially constant cross sectional configuration, the vessel having a lower end and an upper end, the lower end having a downwardly facing opening defined therein having a dimension substantially commensurate with the cross sectional configuration of the vessel, a closure in operative engagement with the lower end of the vessel, the closure having disposed adjacent the surface thereof which is in communication with the cavity of the vessel a foraminous screen, the closure and the screen defining a chamber or plenum, a conduit defining a passageway in full communication with the plenum disposed remote from the interior of the vessel, the conduit having disposed therein a valving means adapted to selectively place the conduit in communication with an air source and a vent, the closure being pivotally mounted and adapted to open by downwardly swinging from the opening in the bottom portion of the vessel, the top portion of the vessel defining a steam source and means to seal the chamber and permit the escape of gas therefrom when a pressure within the container exceeds a predetermined volume.

5. The apparatus of claim 4 wherein the steam source comprises a housing having disposed therein an electric heater and a vent adapted to heat water to provide steam.

References Cited by the Examiner

UNITED STATES PATENTS 3,155,379 11/1964 Fischer et al. _____ 263—21

JOHN J. CAMBY, *Acting Primary Examiner.*